(12) United States Patent
Kuroda et al.

(10) Patent No.: US 6,378,677 B1
(45) Date of Patent: Apr. 30, 2002

(54) POWER TRANSMISSION DEVICE HAVING ELECTROMAGNETIC CLUTCH

(75) Inventors: Koji Kuroda, Saitama (JP); Robert Paul Day, Marysville, OH (US); Kazuhiro Nakano, Saitama (JP); Tetsuro Hamada, Saitama (JP); Yosikazu Konishi, Saitama (JP); Hideaki Fukui, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/677,877

(22) Filed: Oct. 3, 2000

(51) Int. Cl.[7] ............................................. B60K 17/16
(52) U.S. Cl. ...................... 192/35; 192/48.2; 192/54.52; 192/84.7; 192/84.91
(58) Field of Search ........................... 192/35, 49, 48.2, 192/54.52, 84.7, 84.91; 475/231, 238, 239; 180/249

(56) References Cited

U.S. PATENT DOCUMENTS 5,295,921 A * 3/1994 Ippolito et al. ............. 475/238
5,699,888 A * 12/1997 Showalter .................... 192/35
5,884,738 A * 3/1999 Joslin et al. .................. 192/35
5,984,039 A * 11/1999 Mayr .......................... 180/248

* cited by examiner

Primary Examiner—Charles A. Marmor
Assistant Examiner—Saúl Rodriguez
(74) Attorney, Agent, or Firm—Armstrong, Westerman & Hattori, LLP

(57) ABSTRACT

An electromagnetic clutch having a solenoid coil (80), a coil housing (81) disposed surrounding the solenoid coil (80), an armature plate (82) disposed facing the side of the coil housing, and a wet-type multi-plate clutch mechanism, the armature plate being linked to the clutch housing (52). The current flowing to the solenoid coil (80) is controlled so as to control the clamping of the armature plate (82) to the coil housing (81), and the clamping force acting on the armature plate is used made to act on the clutch mechanism via a ball cam mechanism (65). A first rotational backlash amount BLm occurring between the rotation input member and the rotation output member in a rotation transmission system in which the clutch mechanism is interposed in an engaged state, and a second rotational backlash amount BLp occurring between the rotation input member and the rotation output member in a rotation transmission system in which the cam mechanism is interposed in a state in which the cam mechanism is fixed and the armature plate is clamped to the coil housing, are set such that BLm>BLp.

8 Claims, 7 Drawing Sheets

POWER TRANSMISSION DEVICE HAVING ELECTROMAGNETIC CLUTCH

FIELD OF THE INVENTION

The present invention relates to a power transmission device having an electromagnetic clutch comprising a solenoid coil, a coil housing disposed surrounding the solenoid coil, an armature plate disposed facing the side of the coil housing, and a clutch mechanism, wherein the current flowing to the solenoid coil is controlled so as to control the clamping of the armature plate to the coil housing, and the clamping force acting on the armature plate is made to act on the clutch mechanism via a cam mechanism so as to control the engagement of the clutch mechanism.

BACKGROUND OF THE INVENTION

Various electromagnetic clutches of this type were known in the past, and have been disclosed in Japanese Laid-Open Patent Applications H10-194004 and 2000-240685 and elsewhere. The electromagnetic clutches disclosed in these publications are used as differential mechanisms in automobile axles. For instance, in Japanese Laid-Open Patent Application H10-194004, differential clutch mechanisms each composed of an electromagnetic clutch are installed on the left and right of a final reduction mechanism consisting of hypoid gears in a rear axle, and a differential action is achieved and drive is switched between two- and four-wheel-drive modes by engaging and disengaging these left and right differential clutch mechanisms.

A differential clutch mechanism consisting of an electromagnetic clutch with a structure such as this comprises a wet-type multi-plate clutch mechanism, a solenoid mechanism, and a ball cam mechanism. The solenoid mechanism comprises an armature plate facing a coil housing provided around a solenoid coil, the armature plate is linked to the input side of the multi-plate clutch mechanism, and the coil housing is linked to one end of the ball cam mechanism. The other end of the ball cam mechanism is linked to the output side of the wet-type multi-plate clutch mechanism and provides a thrust force for engaging the clutch mechanism.

With this differential clutch mechanism, current is sent to the solenoid coil to generate a magnetic force which clamps the armature plate to the coil housing, and this causes the coil housing to rotate along with the armature plate, so that one end of the ball cam mechanism rotates along with the input side of the clutch mechanism. Because the other (second) end of the ball cam mechanism here is linked to the output side of the clutch mechanism, if there is a rotational difference between the input and output of the clutch mechanism (such as when the rear wheel rotation is different with respect to the rotation on the axle drive side), the second end will be rotationally driven with respect to the first end of the ball cam mechanism, a thrust force in the engagement direction will be imparted from the second end to the wet-type multi-plate clutch mechanism, and the differential clutch mechanism will be engaged.

With this differential clutch mechanism, however, even in a state in which current is sent to the solenoid coil and the armature plate is clamped to the coil housing, the ball cam mechanism will be actuated and the wet-type multi-plate clutch mechanism will be engaged only when there is a difference in the input and output rotation as discussed above. If there is no rotational difference, there will be no thrust force from the ball cam mechanism to engage the wet-type multi-plate clutch mechanism. Consequently, if there is drive from the input side of the differential clutch mechanism and the input rotation speed Nin is greater than the output rotation speed Nout, such as during acceleration, a thrust force from the ball cam mechanism will act in the engagement direction on the wet-type multi-plate clutch mechanism, so that the latter is engaged. Conversely, even if the accelerator pedal is released during driving, so that the input rotation speed Nin drops below the output rotation speed Nout, a thrust force from the ball cam mechanism will act in the engagement direction on the wet-type multi-plate clutch mechanism, so that the latter is engaged.

The direction in which a rotational difference occurs between the input and output members when Nin>Nout is opposite from that when Nin<Nout, and the direction in which one end of the ball cam mechanism rotates with respect to the other end is also opposite in these two cases. Accordingly, when the accelerator pedal is released to change from a state of acceleration to one of deceleration, for instance, the rotational drive force that was acting on the other end in the ball cam mechanism in the acceleration state is temporarily released and the wet-type multi-plate clutch mechanism is disengaged, and when there is a transition to a deceleration state, a rotational drive force in the opposite direction acts on the other end, a thrust force in the engagement direction is exerted on the wet-type multiplate clutch mechanism from the ball cam mechanism, and this clutch mechanism is again engaged. Therefore, it is preferable if the direction of the rotational drive acting on the ball cam mechanism is reversed simultaneously with a transition from an acceleration state to a deceleration state, affording a smooth transition to a deceleration state.

However, in a state in which the wet-type multi-plate clutch mechanism is engaged upon receiving a thrust engagement force from the ball cam mechanism in an acceleration state, the armature plate is clamped to the coil housing by the magnetic force generated when current is sent to the solenoid coil, and torque is transmitted between the input and output members through the power transmission paths on either side of the ball cam mechanism. Specifically, the power transmission path going from the armature plate and the coil housing to which it is clamped through the ball cam mechanism is in parallel with the power transmission path through the wet-type multi-plate clutch mechanism. Accordingly, when there is a transition from this state to a deceleration state, the ball cam mechanism is temporarily locked, and this torque-locked state of the ball cam mechanism is suddenly released only when the transition to a deceleration state proceeds further and the armature plate slides with respect to the coil housing. This results in a reversal in the direction of the rotational drive force acting on the ball cam mechanism, and in the re-engagement of the wet-type multi-plate clutch mechanism, but a problem here is that the direction of the rotational drive force acting on the ball cam mechanism may change sharply all at once, resulting in lurching of the vehicle.

SUMMARY OF THE INVENTION

It is an object of the present invention to provide a power transmission device with which a smooth transition can be made between a state in which the electromagnetic clutch is engaged under conditions of Nin>Nout, such as in the transition from an acceleration state to a differential clutch mechanism, or vice versa, and a state in which the electromagnetic clutch is engaged under conditions of Nin<Nout.

It is a further object of the present invention to provide a power transmission device with which a smoother ride can be achieved without any delay in the switching of the direction of drive [force] acting on the cam mechanism in the above transition.

In the present invention, an electromagnetic clutch has a solenoid coil, a coil housing disposed surrounding the solenoid coil, an armature plate disposed facing the side of the coil housing, and a clutch mechanism (in an embodiment, for example, a mechanism comprising a clutch housing 52, separator plates 53, clutch plates 54, a pressure plate 55, and so forth), the armature plate is linked to a rotation input member (such as a clutch housing 52 in the examples), the rotation input member and a rotation output member (such as a left or right left side shaft 60 in the examples) are engaged and disengaged by the clutch mechanism, the current flowing to the solenoid coil is controlled so as to control the clamping of the armature plate to the coil housing, and the clamping force acting on the armature plate is made to act on the clutch mechanism via a cam mechanism (such as a ball cam mechanism 65 in the examples) so as to control the engagement of the clutch mechanism. The above-mentioned cam mechanism comprises a first cam plate linked to the coil housing, a second cam plate that is linked to the rotation output member and imparts an engagement thrust force to the clutch, and cam balls that are disposed in cam grooves formed in the first and second cam plates and are sandwiched between the first and second cam plates. A first rotational backlash amount $BLm$ occurring between the rotation input member and the rotation output member in a rotation transmission system in which the clutch mechanism is interposed with the clutch mechanism in an engaged state, and a second rotational backlash amount $BLp$ occurring between the rotation input member and the rotation output member in a rotation transmission system in which the cam mechanism is interposed in a state in which the cam mechanism is fixed and the armature plate is clamped to the coil housing, are set such that $BLm>BLp$.

If a power transmission device having an electromagnetic clutch is structured as above, then the difference in the above-mentioned backlash amounts can be utilized in a transition from an acceleration state to a deceleration state so that the cam mechanism is released quickly, without any delay, and torque lock can be prevented, and a smooth transition can be made to a deceleration state with no lurching.

In another possible structure, the clutch mechanism comprises a clutch housing that constitutes the rotation input member, a plurality of separator plates and clutch plates disposed inside the clutch housing and arranged alternating in the axial direction, a pressure plate provided so as to cover the plurality of separator plates and clutch plates, and a clutch hub disposed on the inner peripheral side of the plurality of separator plates and clutch plates, with either the separator plates or the clutch plates being linked to the clutch housing and the other being linked to the clutch hub, and the clutch hub being linked to the rotation output member, and the first rotational backlash amount $BLm$ is determined by the sum of the rotational backlash amount $BLm(1)$ of the linked portion of the clutch housing and either the separator plates or the clutch plates, the rotational backlash amount $BLm(2)$ of the linked portion of the clutch hub and the other of the separator plates or clutch plates, and the rotational backlash amount $BLm(3)$ of the linked portion of the rotation output member and the clutch hub.

Meanwhile, the second rotational backlash amount $BLp$ is determined by the sum of the rotational backlash amount $BLp(1)$ of the linked portion of the rotation input member and the armature plate, the rotational backlash amount $BLp(2)$ of the linked portion of the coil housing and the first cam plate, and the rotational backlash amount $BLp(3)$ of the linked portion of the second cam plate and the rotation output member. In this case, the coil housing and the first cam plate may be press-fitted and spline engaged, so that the rotational backlash amount $BLp(2)=0$.

It is preferable if, when the clutch mechanism is engaged by the cam mechanism, the amount of rotation $BLc$ of the cam mechanism produced by deformation of the clutch mechanism is taken into account so that $BLm>(BLp+BLc)$. If so, then even when deformation occurs in the clutch mechanism, the above-mentioned difference in the backlash amounts can be utilized in a transition from an acceleration state to a deceleration state so that the cam mechanism is released quickly, without any delay, and torque lock can be prevented.

The power transmission device pertaining to the present invention can be disposed inside an axle that transmits drive force to left and right wheels.

In this case, the power transmission devices pertaining to the present invention can be disposed symmetrically on the left and right of a final reduction driven gear that constitutes the axle, providing a differential action and switching between two- and four-wheel-drive modes.

Alternatively, the power transmission devices pertaining to the present invention may be disposed ahead of a final reduction driven gear that constitutes the axle, and perform switching between two- and four-wheel-drive modes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
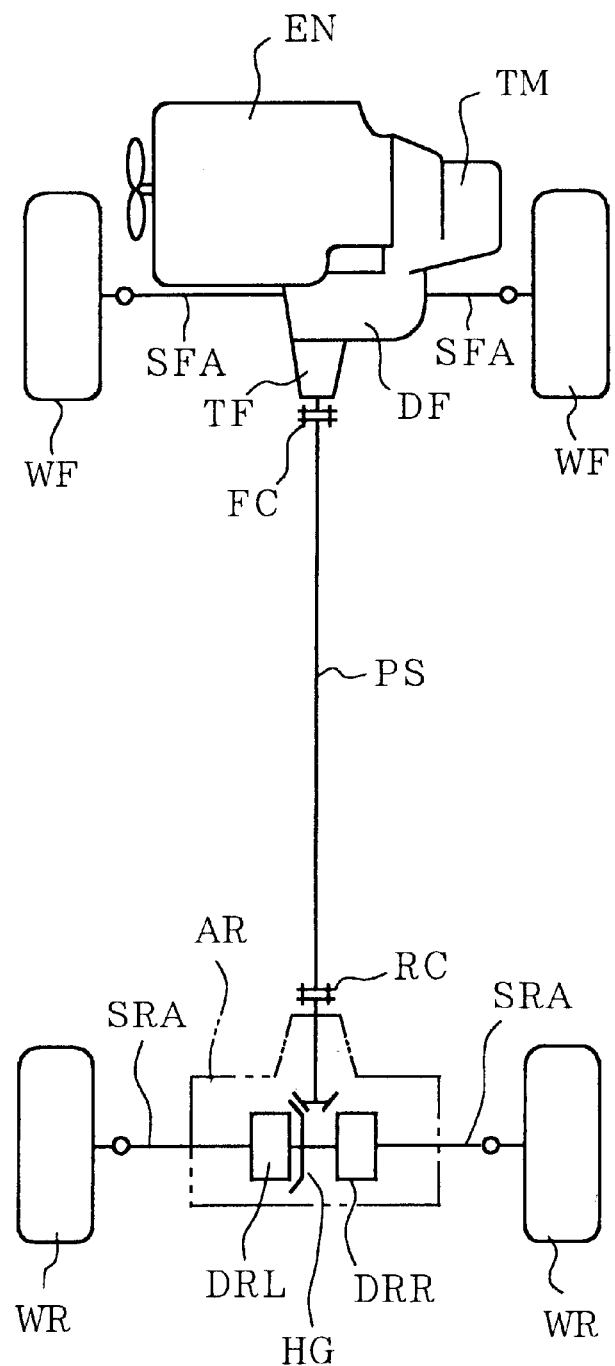
FIG. 1 is a schematic diagram illustrating a power transmission system in a four-wheel-drive vehicle, equipped with the power transmission device pertaining to the present invention.
Figure 2:
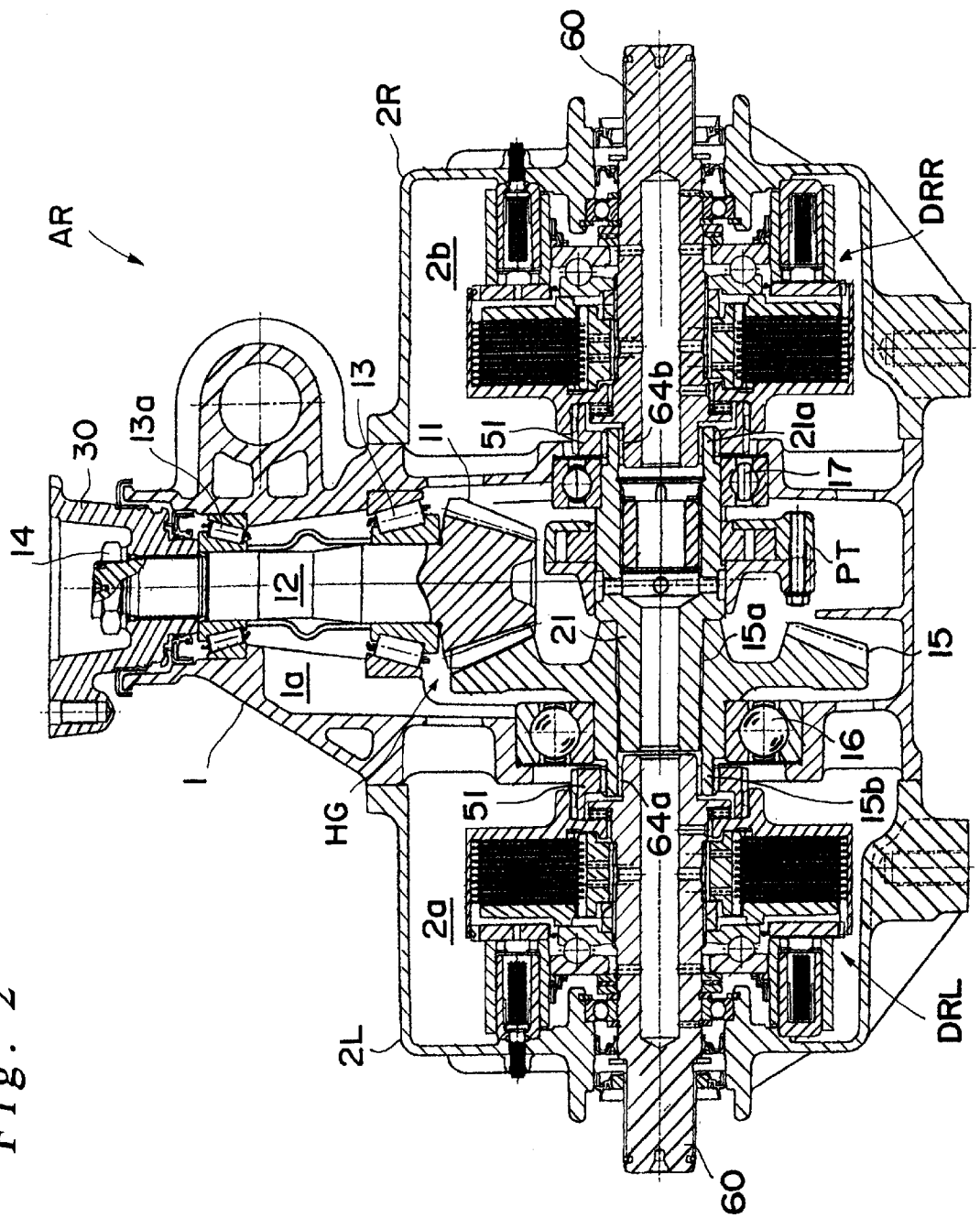
FIG. 2 is a cross section illustrating the structure of the rear axle in the above-mentioned power transmission device.
Figure 3:
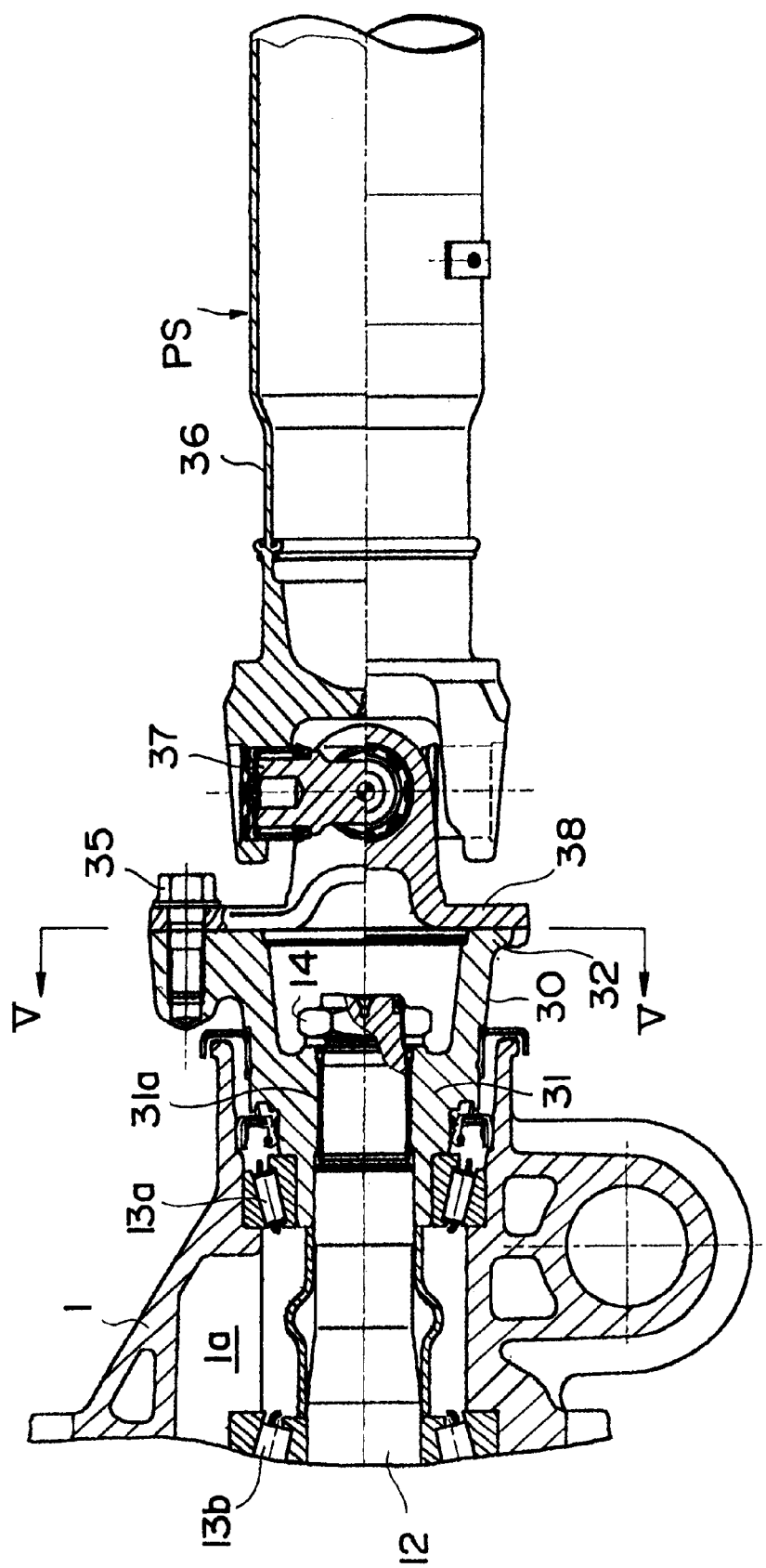
FIG. 3 is a partial cross section illustrating the linked portion of the above-mentioned rear axle and a propeller shaft.

Preferred embodiments of the present invention will now be described through reference to the figures. The first description will be of an axle in which an electromagnetic clutch is used as a differential clutch mechanism as an example of the power transmission device pertaining to the present invention. FIG. 1 illustrates a power transmission system having an axle equipped with this differential clutch mechanism.

This vehicle is a four-wheel-drive vehicle, in which an engine EN is installed transversely at the front of the chassis and a transmission TM is integrally coupled to the output end of the engine EN. A front differential mechanism DF and a transfer mechanism TF are provided inside this transmission TM. The power of the engine EN, whose speed is varied by the transmission TM, is split by the front differential mechanism DF and transmitted to left and right front axle shafts SFA so as to drive the left and right front wheels WF. The above-mentioned engine power is also split by the transfer mechanism TF and transmitted from a front coupling FC to a propeller shaft PS. This propeller shaft PS is linked to a rear axle device AR via a rear coupling RC.

The rear axle device AR has a hypoid gear mechanism HG (final reduction mechanism) that converts the rotational direction such that the rotation of the propeller shaft PS can be transmitted to rear axle device shafts SRA perpendicular to this rotation, and reduces the speed of this rotation, and a pair of left and right differential clutch mechanisms DRL and DRR that are located to the left and right of the hypoid gear mechanism HG and control the transmission of the rotational power of the hypoid gear mechanism HG to the rear axle shafts SRA. In the rear axle AR, the engine power transmitted through the propeller shaft PS is converted in its rotational direction via the hypoid gear mechanism HG and is reduced in speed, then split and transmitted to the left and right rear axle shafts SRA with the transmission controlled by the left and right differential clutch mechanisms DRL and DRR, allowing the left and right rear wheels WR to be driven.

These rear differential clutch mechanisms DRL and DRR have electromagnetic clutches, whose engagement is controlled according to the rotational speed of the wheels, the gear ratios of the vehicle, and so forth. Accordingly, if the left and right rear differential clutch mechanisms DRL and DRR are both released, the engine power is not transmitted to the rear wheels WR, and only the front wheels WF are driven, resulting in a two-wheel-drive state. On the other hand, if the left and right rear differential clutch mechanisms DRL and DRR are engaged, the engine power is transmitted to the front wheels WF and to the rear wheels WR, resulting in a four-wheel-drive state. In this four-wheel-drive state, the rear differential clutch mechanisms DRL and DRR are engaged whenever there is a difference between the drive-side rotation and the wheel rotation, as will be discussed below. Suitably controlling the engagement of the left and right rear differential clutch mechanisms DRL and DRR affords the suitable control of the ratio in which the power is split to the left and right rear wheels WR, providing what is known as a differential function.

The above-mentioned rear axle device AR will be described through reference to FIGS. 2 to 6. The pair of left and right rear differential clutch mechanisms DRL and DRR are installed inside the rear axle device AR as mentioned above, but since these have a structure that is symmetrical to the left and right, the left and right symmetrical portions will be labeled the same and redundant descriptions will be omitted.

The rear axle device AR has a center housing 1 and left and right side housings 2L and 2R coupled to the left and right ends of the center housing 1. The hypoid gear mechanism HG is disposed inside a center space 1A formed inside the center housing 1, the left rear differential clutch mechanism DRL is disposed inside a left side space 2a formed inside the left side housing 2L, and the right differential clutch mechanism DRR is disposed in a right side space 2b formed inside the right side housing 2R.

The hypoid gear mechanism HG disposed inside the center housing 1 comprises a drive pinion 11 and a driven gear 15 whose rotational axes are perpendicular and which mesh with each other. The drive pinion 11 is able to rotate around a rotational axis extending in the longitudinal direction of the chassis, and has a pinion shaft 12 that extends in the longitudinal direction of the chassis and is supported rotatably with respect to the center housing 1 by tapered roller bearings 13a and 13b. The distal end of the pinion shaft 12 protrudes out from the center housing 1.

Figure 5:
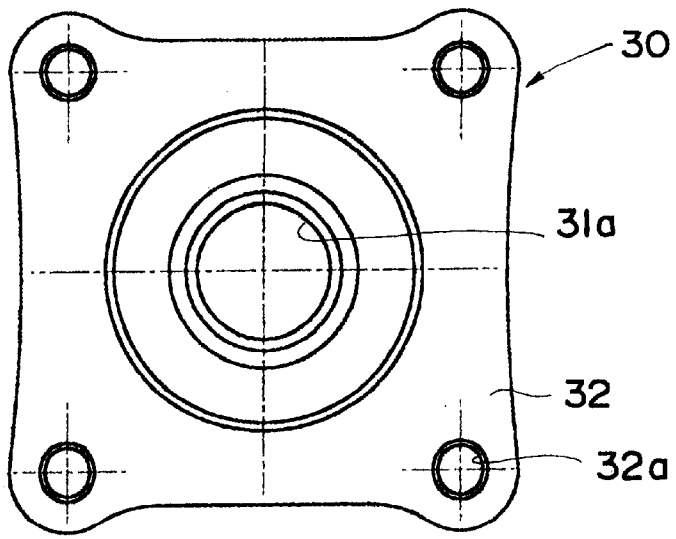
FIG. 5 illustrates the end face shape of the companion flange used in the rear axle.

A companion flange 30 is fastened by a retainer nut 14 and splined to this portion of the pinion shaft 12 that protrudes outward. The companion flange 30 is linked to the pinion shaft 12 by a spline 31a formed on a boss 31, and has at its outer end an end face flange 32 shaped as shown in FIG. 5. Threaded holes 32a for attaching fastener bolts are formed in the end face flange 32. Meanwhile, the propeller shaft PS has a yoke flange 38 attached via a universal joint 37 to the rear end of a drive tube 36 extending in the longitudinal direction of the chassis and rotatably supported, and this yoke flange 38 and the companion flange 30 are coupled by fastener bolts 35. The yoke flange 38 and the companion flange 30 constitute the rear coupling RC. The rotation of the propeller shaft PS is transmitted to the drive pinion 11 and rotationally drives the hypoid gear mechanism HG.

The driven gear 15 of the hypoid gear mechanism HG is rotatable around the rotational axis extending in the lateral direction of the chassis (the rotational axis perpendicular to the rotational axis of the drive pinion 11) and is supported by the center housing 1 via a ball bearing 16. An internal spline 15a is formed around the rotational axis in the driven gear 15, and a center shaft 21 that meshes with this internal spline 15a at the left end is disposed inside the center housing 1 along the same axis as the driven gear 15. The right end of the center shaft 21 is rotatably supported by the center housing 1 via a ball bearing 17, and the center shaft 21 rotates integrally with the driven gear 15.

The left end 15b of the driven gear 15 is splined to a left linking ring 51 around the outer periphery, and the driven gear 15 is linked to the left rear differential clutch mechanism DRL via this left linking ring 51. The right end 21a of the center shaft 21 is splined to the left linking ring 51 around the outer periphery, and the center shaft 21 is linked to the left rear differential clutch mechanism DRL via this left linking ring 51. Here, the center shaft 21 is splined to the driven gear 15, and the driven gear 15 (that is, the hypoid gear mechanism HG) is linked to the left and right differential clutch mechanisms DRL and DRR.

Figure 4:
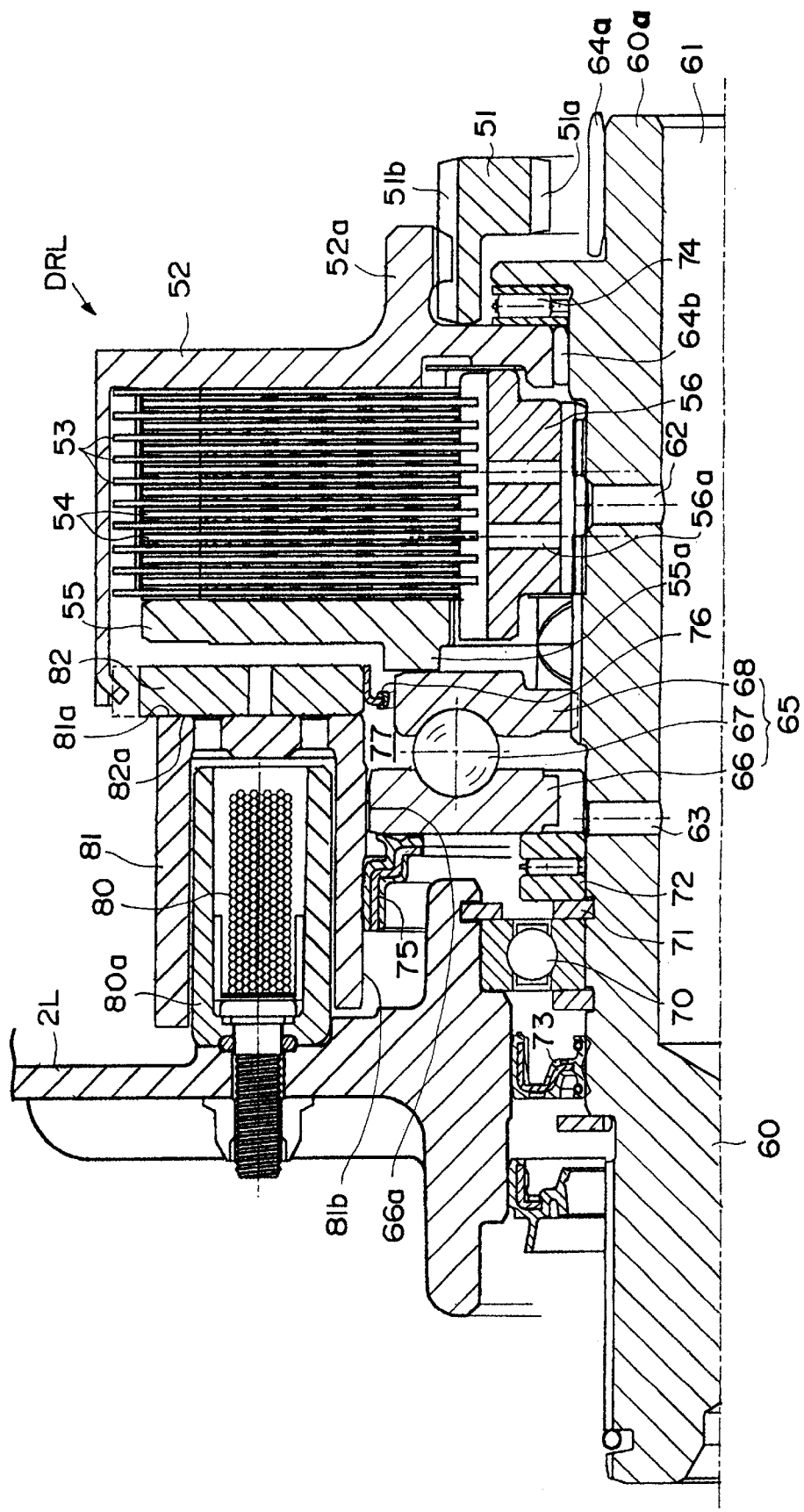
FIG. 4 is a cross section illustrating the left differential clutch mechanism in the above-mentioned rear axle.

These left and right differential clutch mechanisms DRL and DRR will be described through reference to FIG. 4, which illustrates the left differential clutch mechanism DRL. As mentioned above, the left differential clutch mechanism DRL is in left and right symmetry with the right differential clutch mechanism DRR, and since the structure and operation thereof are identical, only the left differential clutch mechanism DRL will be described, and description of the right differential clutch mechanism DRR will be omitted.

The left differential clutch mechanism DRL has the cylindrical clutch housing 52 and a plurality of separator plates 53 and a plurality of clutch plates 54 disposed inside this clutch housing 52. The clutch housing 52 is splined to the outer periphery 51b of a linking ring 51 at a right end hub 52a. The separator plates 53 consist of metal disk-shaped members that are engaged with the inner surface of the clutch housing 52 around the outer periphery, and rotate integrally with the clutch housing 52. The clutch plates 54 comprise a clutch facing material bonded to both sides of metal disk-shaped members, and are disposed between the various separator plates 53. Specifically, the separator plates 53 and the clutch plates 54 are arranged alternating in the axial direction. A disk-shaped pressure plate 55 is provided so as to cover from the outside these plates 53 and 54 that are disposed inside the clutch housing 52 in these alternating positions.

A clutch hub 56 is provided on the inner peripheral side of the separator plates 53, clutch plates 54, and pressure plate 55 disposed inside the clutch housing 52. The inner periphery of the clutch plates 54 engages with the outer periphery of the clutch hub 56, so that the clutch plates 54 and the clutch hub 56 rotate integrally. This clutch hub 56 is disposed over a left side shaft 60, splined at the inner periphery. The clutch housing 52 is rotatably attached over the left side shaft 60 by a radial bearing 64b and a thrust bearing 74.

The left side shaft 60 has its right end 60a inserted into a support hole formed in the right end of the driven gear 15, so that the left side shaft 60 is rotatably supported by a radial bearing 64a, and on its left side is rotatably supported by the left side housing 2L via a ball bearing 70. In the case of the left side shaft 60, the right end is inserted into a support groove formed in the left end of the center shaft 21 and is rotatably supported by a radial bearing 64a. This left shaft 60 is connected to the left rear wheel WR and constitutes the left rear axle shaft SRA.

The inner side surface of the pressure plate 55 protrudes to the left and forms a pressing component 55a, and a ball cam mechanism 65 is disposed so as to abut against this pressing component 55a. The ball cam mechanism 65 comprises a first cam plate 66 disposed rotatably over the left side shaft 60, a second cam plate 68 disposed splined to the left side shaft 60, and a plurality of cam balls 67 disposed in a plurality of cam grooves 66a and 68a formed in the cam plates 66 and 68 (see FIGS. 6A and 6B).

The first cam plate 66 is axially positioned with respect to the left side shaft 60 by a retaining ring 72 and a thrust bearing 72. Accordingly, as discussed below, the thrust force generated by the ball cam mechanism 65 is received by the first cam plate 66, acts on the second cam plate 68 via the cam balls 67, moves the second cam plate 68 to the right, and presses the pressing component 55a of the pressure plate 55 to the right.

A doughnut-shaped coil housing 81 having a rectangular cross section open at the left end is disposed on the outer peripheral side of the first cam plate 66. This coil housing 81 is in the form of a doughnut centered around the rotational center of the left side shaft 60, is splined at its inner periphery to the outer periphery of the first cam plate 66, and is able to rotate over the left side shaft 60 integrally with the first cam plate 66.

A solenoid coil 80 is provided protruding into a space with a rectangular cross section and open at the left end in the coil housing 81. This solenoid coil 80 is formed in a doughnut shape covered by a solenoid cover 80a, and is fixed to the left side housing 2L. There is gap between the outer surface of the solenoid cover 80a and the inner surface of the rectangular-cross-section space of the coil housing 81, and the coil housing 81 is freely rotatably with respect to the fixed solenoid coil 80.

A disk-shaped armature plate 82 is provided facing a sliding surface 81a that forms the right end surface of the coil housing 81. The armature plate 82 engages with the clutch housing 52 around its outer periphery, and rotates integrally with the clutch housing 52.

An oil seal 75 is attached to the inner peripheral surface 81b of the coil housing 81, and the lip thereof slides over the left side of the first cam plate 66. An oil fence ring 76 is attached to the inner peripheral surface of the armature plate 82. As a result, an oil reservoir 77 is formed by being sandwiched between the oil seal 75 and the oil fence 76 on the inner peripheral side of the inner peripheral surface of the armature plate 82 and the inner peripheral surface of the coil housing 81. This oil reservoir 77 communicates with the gap between the sliding surface 81a of the coil housing and the sliding surface 82a forming the left end surface of the armature plate 82.

The oil fence ring 76 comprises a rubber lip attached to the inner peripheral end of an annular metal core. Therefore, the inner peripheral end of the oil fence ring 76 is close to the outer peripheral surface of the second cam plate 68, but even if the two should come into contact during rotation, the contact is between rubber and metal, thereby avoiding the problems of scratching and noise generated by contact.

A first lubricating hole 61 extending in the axial direction from the right end surface is formed inside the left side shaft 60, and second and third lubricating holes 62 and 63 are formed extending radially from this first lubricating hole 61. Lubricating oil is supplied to the first lubricating hole 61 from a trochoid pump PT attached over the center shaft 21. This lubricating oil is supplied from the second lubricating hole 62, through a lubricating hole 56a formed in the clutch hub 56, to the space between the separator plates 53 and the clutch plates 54, and is supplied from the third lubricating hole 63, through the ball cam mechanism 65 (through the space between the first cam plate 66 and the second cam plate 68), to the oil reservoir 77. Therefore, the ball cam mechanism 65 is also thoroughly lubricated.

The lubricating oil in the oil reservoir 77 is effectively supplied to the gap between the sliding surface 81a of the coil housing 81 and the sliding surface 82a of the armature plate 82. Accordingly, smooth sliding contact is achieved, without any noise being generated, when the sliding surface 81a of the coil housing 81 is in sliding contact with the sliding surface 82a of the armature plate 82.

The operation of the left differential clutch mechanism DRL structured as above will now be described.

As mentioned above, when [the engine power] is transmitted from the propeller shaft PS to the hypoid gear mechanism HG so as to rotationally drive the driven gear 15, the rotational power is transmitted through the linking ring 51 to the clutch housing 52 so as to rotationally drive the clutch housing 52. Here, when the thrust force is not acting upon the pressure plate 55 via the ball cam mechanism 65, that is, when the pressure plate 55 is in a free state, the separator plates 53 merely rotate integrally with the clutch housing 52, and the clutch plates 54 rotate integrally with the clutch hub 56, with no power transmitted between the plates 53 and 54. Accordingly, no drive force is transmitted to the rear wheels WR, and the vehicle will be in a two-wheel-drive state.

Meanwhile, when the thrust force presses the pressure plate 55 to the right from the ball cam mechanism 65, the pressure plate 55 presses the separator plates 53 and clutch plates 54 against the clutch housing 52, and the plates 53 and 54 are engaged by their frictional force. This causes the clutch housing 52 and the clutch hub 56 to rotate integrally, resulting in a four-wheel-drive state in which the drive force is transmitted to the rear wheels WR.

Controlling the thrust force in this way so that it is applied to the pressure plate 55 through the ball cam mechanism 65 is accomplished by controlling the current sent to the solenoid coil 80. When the power to the solenoid coil 80 is switched on, a magnetic force is generated in the coil housing 81 surrounding this coil, and the armature plate 82 is clamped to the coil housing 81. As a result, the sliding surface 81a of the coil housing 81 slides with the sliding surface 82a of the armature plate 82, and a rotational force F acts upon the coil housing 81 such that the coil housing 81 is made to rotate the same as the armature plate 82, which rotates integrally with the clutch housing 52.

Here, the coil housing 81 is coupled to the first cam plate 66, and the first cam plate 66 is coupled to the left side shaft 60 and rotates integrally with the rear wheels WR. The armature plate 82, on the other hand, is engaged with the clutch housing 52, and the clutch housing 52 is linked to the driven gear 15 and corresponds to the rotation of the engine EN. We can see from this that the above-mentioned rotational force F is not generated when the rotation of the driven gear 15 driven by the engine EN is the same as the rotation of the rear wheels WR, but this rotational force F is generated when there is a rotational difference.

Figures 6A, 6B:
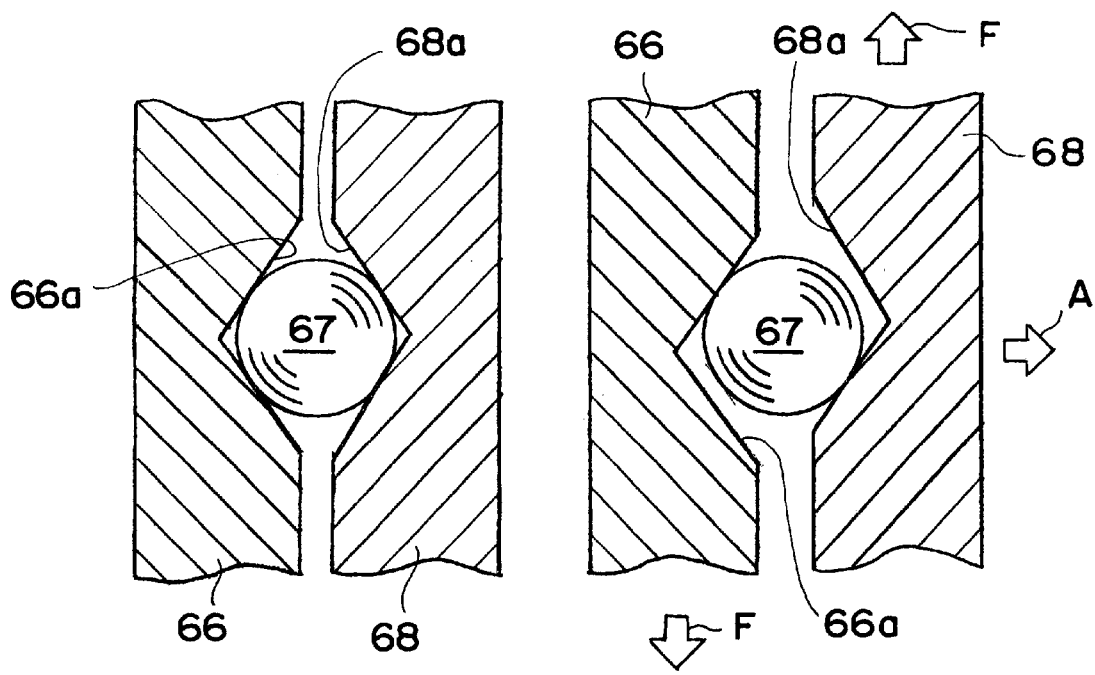
FIGS. 6A to 6C are cross sections illustrating the ball cam mechanism that constitutes the above-mentioned left differential clutch mechanism.

When a rotational difference thus occurs between the rotation of the driven gear 15 driven by the engine EN and the rotation of the rear wheels WR, and the above-mentioned rotational force F is generated, this rotational force F acts as a force that rotates the second cam plate 68 with respect to the first cam plate 66 in the ball cam mechanism 65, as shown in FIG. 6B. Here, cam balls 67 are disposed within cam grooves 66a and 68a, which have tapered surfaces, in between the two cam plates 66 and 68. Accordingly, the above-mentioned rotational force F causes the second cam plate 68 to rotate relative to the first cam plate 66, and the second cam plate 68 moves to the right in the axial direction as indicated by the arrow A in FIG. 6B.

This movement of the second cam plate 68 to the right presses the pressing component 55a of the pressure plate 55 to the right, and the pressure plate 55 presses the separator plates 53 and clutch plates 54 against the clutch housing 52. As a result, the plates 53 and 54 are engaged by their frictional force, and the above-mentioned rotational difference is suppressed. The pressing force exerted on the pressure plate 55 in this case corresponds to the above-mentioned rotational force F, and this rotational force F corresponds to the attractive force of the armature plate 82 resulting from the magnetic force of the armature plate 82.

As can be seen from the above, the clutch engagement force can be freely controlled in the left differential clutch mechanism DRL by controlling the current sent to the solenoid coil 80, allowing control over the clamping of the armature plate 82 while the sliding surface 82a of the armature plate 82 slides with respect to the sliding surface 81a of the coil housing 81. Smooth control is possible here because the lubricating oil is effectively supplied in between the sliding surfaces 81a and 82a from the oil reservoir 77.

When the sliding surface 82a of the armature plate 82 is clamped by magnetic force to the sliding surface 81a of the coil housing 81 as above, if there is a gap between the sliding surfaces 81a and 82a, then the flow of the magnetic flux will be obstructed in this portion and the clamping force will decrease. Accordingly, it is preferable to make the gap between the sliding surfaces 81a and 82a as small as possible, that is, for the sliding surfaces 81a and 82a to be as close together as possible. Because the armature plate 82 is disk-shaped as shown in the figures, it may be deformed into a conical shape by heat treatment or the like. The amount of this deformation is small, but this deformation decreases the clamping force because it produces a gap between the above-mentioned sliding surfaces 81a and 82a. Accordingly, it is preferable to work the sliding surface 81a of the coil housing 81 to match the deformed shape of the coil housing 81, thereby reducing the gap between the sliding surfaces 81a and 82a and providing a snugger fit.

With the left rear differential clutch mechanism DRL structured as above, even in a state in which current is sent to the solenoid coil and the armature plate is clamped to the coil housing, that is, in a four-wheel-drive state, the ball cam mechanism 65 will not be actuated unless there is a difference between the rotation of the rear wheels WR and the rotation of the driven gear 15 driven by the engine EN. Once this rotational difference does occur, the ball cam mechanism 65 causes the pressure plate 55 to press the separator plates 53 and clutch plates 54 against the clutch housing 52, and the plates 53 and 54 are engaged by their frictional force.

Accordingly, when there is drive from the input side (the driven gear 15 side) of the left rear differential clutch mechanism DRL and the input rotation speed Nin of this left rear differential clutch mechanism DRL is greater than the output rotation speed Nout, such as during acceleration, a pressing force from the ball cam mechanism 65 is exerted on the pressure plate 55, and the separator plates 53 and the clutch plates 54 are engaged. Conversely, if the accelerator pedal is released during driving, so that the input rotation speed Nin drops below the output rotation speed Nout, a pressing force from the ball cam mechanism 65 will act on the pressure plate 55, and the separator plates 53 and the clutch plates 54 will be engaged.

Figure 6C:
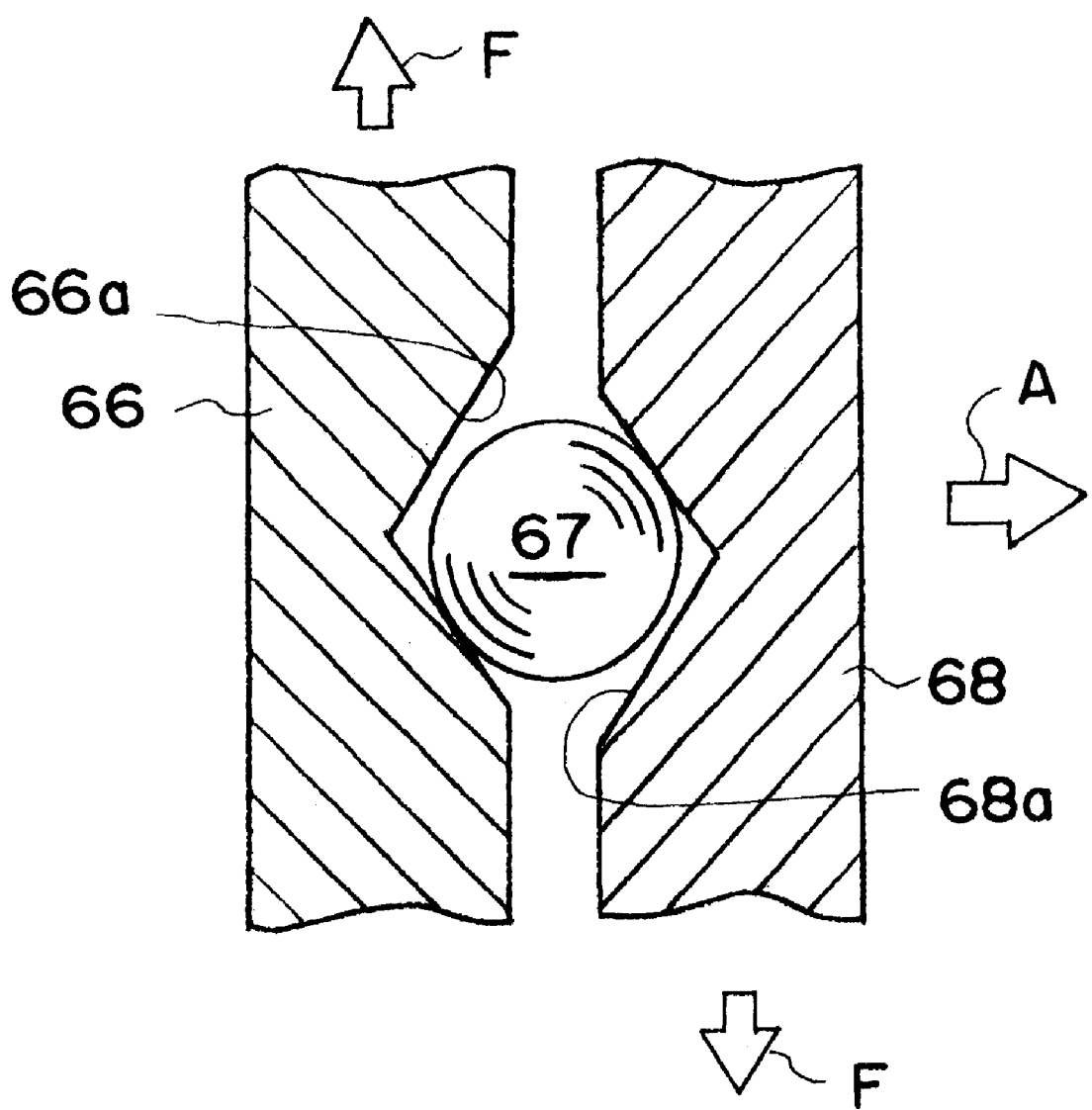

The direction in which a rotational difference occurs between the input and output members when Nin>Nout is opposite from that when Nin<Nout, and the direction in which one end (the first cam plate 66) of the ball cam mechanism 65 is rotationally driven with respect to the other end (the second cam plate 68) is also opposite in these two cases. For example, the rotational drive force F shown in FIG. 6B acts on the ball cam mechanism 65 under conditions of Nin>Nout in an acceleration state, but as shown in FIG. 6C, the rotational drive force F acts in the opposite direction from that in FIG. 6B under conditions of Nin<Nout in a deceleration state. The direction of the pressing force A pressing the pressure plate 55 from the second cam plate 68 of the ball cam mechanism 65 is the same in either case. Accordingly, when, for example, the accelerator pedal is released and the acceleration state becomes a deceleration state, the rotational drive force F that was acting on the ball cam mechanism 65 in the acceleration state as shown in FIG. 6B is temporarily released, and the rotational drive force F in the opposite direction as shown in FIG. 6C acts on the ball cam mechanism 65 in a deceleration state.

In a state in which the separator plates 53 and clutch plates 54 are engaged by receiving a thrust engagement force A from the ball cam mechanism 65 in an acceleration state, the armature plate 82 is clamped to the coil housing 81 by the magnetic force generated when current is sent to the solenoid coil 80. Accordingly, a power transmission path is formed via the ball cam mechanism 65 from the armature plate 82 and the coil housing 81 to which the armature plate 82 is clamped (this is called the ball cam rotation transmission system), a power transmission path is formed via the clutch hub 56 and the engaged separator plates 53 and clutch plates 54 from the clutch housing 52 (this is called the main rotation transmission system), and these two power transmission paths are formed in parallel.

There is therefore the danger that during a transition from an acceleration state to a deceleration state, the ball cam mechanism 65 will temporarily be locked in the state shown in FIG. 6B, and the torque-locked state of the ball cam mechanism 65 will only be released when the transition to the deceleration state proceeds until the armature plate 82 slides with respect to the coil housing 81. If this should happen, then during a transition from an acceleration state to a deceleration state, there is the danger that the release of the ball cam mechanism 65 will be delayed and the release will occur all of a sudden, which would suddenly alter the direction of rotational drive acting on the ball cam mechanism 65 and result in lurching.

Because of this, in the left rear differential clutch mechanism DRL in this example, the first rotational backlash amount BLm that occurs in the main rotation transmission system and the second rotational backlash amount BLp that occurs in the ball cam rotation transmission system are set such that (first rotational backlash amount BLm)>(second rotational backlash amount BLp).

The "main rotation transmission system" here is a power transmission system that transmits rotational power from the clutch housing 52 to the left side shaft 60 through the separator plates 53 and clutch plates 54 in a state in which the plates 53 and 54 are engaged. In this main rotation transmission system, the amount of backlash occurring between the clutch housing 52 and the left side shaft 60 is the first rotational backlash amount BLm. The "ball cam rotation transmission system" is a power transmission system that transmits rotational power from the clutch housing 52 to the left side shaft 60 through [the armature plate 82 and the coil housing 81] in a state in which the armature plate 82 is clamped to the coil housing 81 and the ball cam mechanism 65 is fixed. In this ball cam rotation transmission system, the amount of backlash occurring between the clutch housing 52 and the left side shaft 60 is the second rotational backlash amount BLp.

In more specific terms, the first rotational backlash amount BLm is determined by the sum of the rotational backlash amount BLm(1) of the splined portion of the clutch housing 52 and the clutch plates 54, the rotational backlash amount BLm(2) of the splined portion of the separator plates 53 and the clutch hub 56, and the rotational backlash amount BLm(3) of the splined portion of the clutch hub 56 and the left side shaft 60. Also, the second rotational backlash amount BLp is determined by the sum of the rotational backlash amount BLp(1) of the engaged portion of the clutch housing 52 and the armature plate 82, the rotational backlash amount BLp(2) of the splined portion of the coil housing 81 and the first cam plate 66, and the rotational backlash amount BLp(3) of the splined portion of the second cam plate 68 and the left side shaft 60. In this case, the coil housing 81 and the first cam plate 66 may be press-fitted and spline engaged, so that the rotational backlash amount BLp(2)=0 in this portion.

Under these backlash settings, the rotational drive direction is reversed during a transition from an acceleration state to a deceleration state, so the entire main rotation transmission system rotates in the deceleration direction by the first rotational backlash amount BLm with the separator plates 53 and the clutch plates 54 still engaged, and the entire ball cam rotation transmission system rotates in the deceleration direction by the second rotational backlash amount BLp with the ball cam mechanism 65 still locked. Here, since the settings are such that (first rotational backlash amount BLm)>(second rotational backlash amount BLp) as mentioned above, the amount of rotation is greater with the main rotation transmission system. Because the pressure plate 55 which rotates as the main rotation transmission system is in contact with and joined to the second cam plate 68, the second cam plate 68 rotates by the same amount as the main rotation system, and the second cam plate 68 rotates more than the first cam plate 66 in the ball cam mechanism 65. As a result, the ball cam mechanism 65 is unlocked, which is accompanied by a release of the pressing force of the pressure plate 55, and the separator plates 53 and clutch plates 54 are disengaged.

Thus setting these amounts such that (first rotational backlash amount BLm)>(second rotational backlash amount BLp) allows the ball cam mechanism 65 to be released quickly, with no delay, during a transition from an acceleration state to a deceleration state, thereby preventing torque lock and affording a smooth transition to a deceleration state with no lurching. The above example is of a transition from an acceleration state to a deceleration state, but the same applies when the situation is reversed.

When the pressure plate 55 is pressed from the second cam plate 68 of the ball cam mechanism 65 so as to engage the separator plates 53 and clutch plates 54, these plates undergo compressive deformation as a result of this pressing force A (this compressive deformation is particularly pronounced in the facing material of the clutch plates 54). The second cam plate 68 is rotated further and moved in the pressing direction so as to absorb this deformation. Accordingly, once the ball cam mechanism 65 is relieved of the pressing force during a transition from an acceleration state to a deceleration state as discussed above, the above-mentioned compressive deformation goes away and the original form returns, and the second cam plate 68 rotates by a corresponding amount. The amount of rotation of this second cam plate 68 in response to the above-mentioned compressive deformation apparently increases the above-mentioned second rotational backlash amount BLP.

The amount of rotation of this second cam plate 68 in response to the above-mentioned compressive deformation is termed the third rotation backlash amount BLc, and with this in mind, it is preferable for the settings to be such that (first rotational backlash amount BLm)>((second rotational backlash amount BLp)+(third rotation backlash amount BLc)). This effectively prevents the occurrence of torque lock of the ball cam mechanism 65 during a transition from an acceleration state to a deceleration state.

It is undesirable for the above-mentioned backlash amounts themselves to be larger, and they should be kept to a minimum. In particular, the third rotation backlash amount BLc can be kept small by raising the rigidity of the clutch housing 52, the separator plates 53, the clutch plates 54, and the pressure plate 55.

Figure 7:
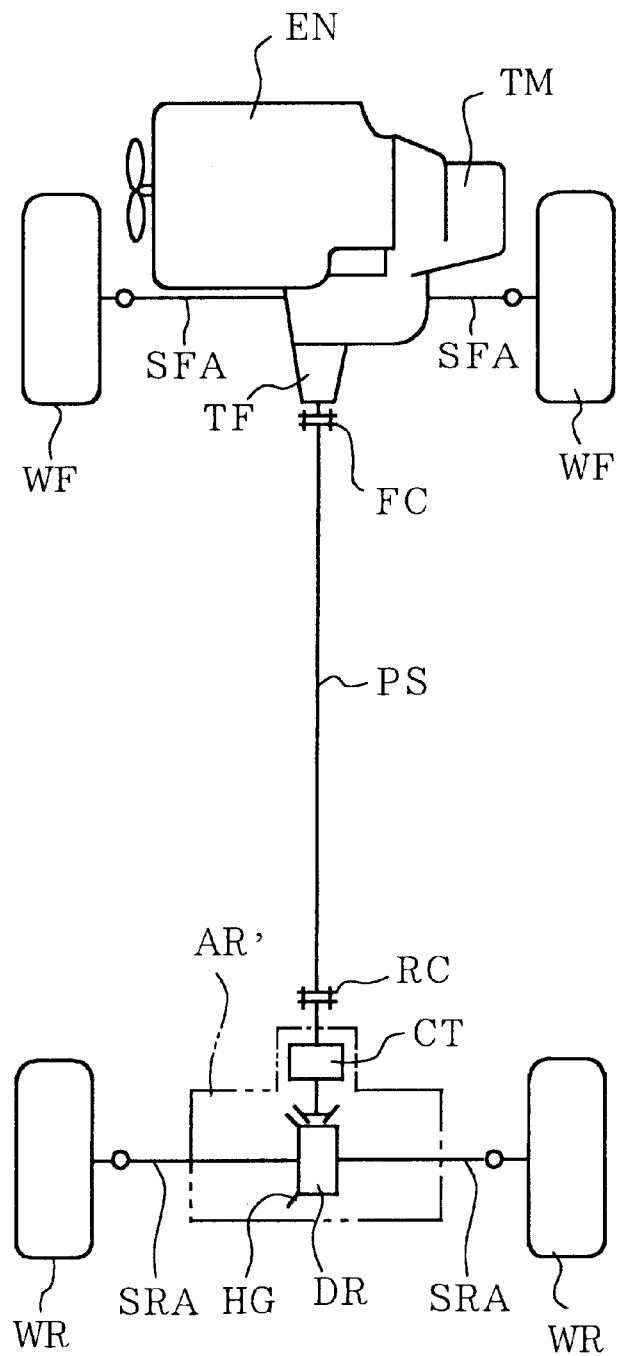
FIG. 7 is a schematic diagram illustrating the power transmission system pertaining to a different example of a four-wheel-drive vehicle having the electromagnetic clutch pertaining to the present invention.

The left and right differential clutch mechanisms DRL and DRR are disposed on either side of the driven gear 15 of the hypoid gear mechanism HG in the above-mentioned rear axle AR, but the electromagnetic clutch mechanism pertaining to the present invention may instead be disposed ahead of the hypoid gear mechanism HG, as shown in FIG. 7. Those components in FIG. 7 that are the same as in the power transmission system in FIG. 1 are labeled the same, and will not be described again.

With the power transmission system in FIG. 7, the electromagnetic clutch mechanism is disposed between the rear coupling RC and the hypoid gear mechanism HG, and a 2–4 switching mechanism CT is constituted by this electromagnetic clutch mechanism. As a result, power transmission from the propeller shaft PS to the hypoid gear mechanism HG can be blocked to achieve a two-wheel-drive state, or this power transmission can be enabled to achieve a four-wheel-drive state. The power is split by a rear differential mechanism DR and transmitted from the hypoid gear mechanism HG to the left and right rear wheels WR. This rear differential mechanism DR may be a mechanism commonly used in the past, or the left and right rear differential clutch mechanisms DRL and DRR discussed above may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission device having an electromagnetic clutch, wherein the electromagnetic clutch has a solenoid coil, a coil housing disposed surrounding the solenoid coil, an armature plate disposed facing the side of the coil housing, and a clutch mechanism, the armature plate being linked to a rotation input member, and the rotation input member and a rotation output member being engaged and disengaged by the clutch mechanism, the current flowing to the solenoid coil is controlled so as to control the clamping of the armature plate to the coil housing, and the clamping force acting on the armature plate is made to act on the clutch mechanism via a cam mechanism so as to control the engagement of the clutch mechanism, and a first rotational backlash amount $BL_m$ occurring between the rotation input member and the rotation output member in a rotation transmission system in which the clutch mechanism is interposed in a state in which the clutch mechanism is engaged, and a second rotational backlash amount $BL_p$ occurring between the rotation input member and the rotation output member in a rotation transmission system in which the cam mechanism is interposed in a state in which the cam mechanism is fixed and the armature plate is clamped to the coil housing, are set such that $BL_m > BL_p$.

2. The power transmission device according to claim 1, wherein the clutch mechanism comprises a clutch housing that constitutes the rotation input member, a plurality of separator plates and clutch plates disposed inside the clutch housing and arranged alternating in the axial direction, a pressure plate provided so as to cover the plurality of separator plates and clutch plates, and a clutch hub disposed on the inner peripheral side of the plurality of separator plates and clutch plates, either the separator plates or the clutch plates being linked to the clutch housing and the other being linked to the clutch hub, and the clutch hub being linked to the rotation output member, and the first rotational backlash amount $BL_m$ is determined by the sum of the rotational backlash amount $BL_m(1)$ of the linked portion of the clutch housing and either the separator plates or the clutch plates, the rotational backlash amount $BL_m(2)$ of the linked portion of the clutch hub and the other of the separator plates or clutch plates, and the rotational backlash amount $BL_m(3)$ of the linked portion of the rotation output member and the clutch hub.

3. The power transmission device according to claim 1, wherein the cam mechanism comprises a first cam plate linked to the coil housing, a second cam plate that is linked to the rotation output member and imparts an engagement thrust force to the clutch, and cam balls that are disposed in cam grooves formed in the first and second cam plates and are sandwiched between the first and second cam plates, and the second rotational backlash amount $BL_p$ is determined by the sum of the rotational backlash amount $BL_p(1)$ of the linked portion of the rotation input member and the armature plate, the rotational backlash amount $BL_p(2)$ of the linked portion of the coil housing and the first cam plate, and the rotational backlash amount $BL_p(3)$ of the linked portion of the second cam plate and the rotation output member.

4. The power transmission device according to claim 3, wherein the coil housing and the first cam plate are press-fitted and spline engaged, and the rotational backlash amount $BL_p(2)=0$.

5. The power transmission device according to claim 1, wherein the power transmission device is designed such that, when the clutch mechanism is engaged by the cam mechanism, the amount of rotation $BL_c$ of the cam mechanism produced by deformation of the clutch mechanism is taken into account and that $BL_m > (BL_p + BL_c)$.

6. The power transmission device according to claim 1, disposed inside an axle device that transmits drive force to left and right wheels.

7. The power transmission device according to claim 1, disposed symmetrically on the left and right of a final reduction driven gear that constitutes the axle device, and providing a differential action and switching between two- and four-wheel-drive modes.

8. The power transmission device according to claim 1, disposed ahead of a final reduction driven gear that constitutes the axle device, and performing switching between two- and four-wheel-drive modes.

* * * * *